United States Patent
Carini et al.

(10) Patent No.: US 6,456,740 B1
(45) Date of Patent: Sep. 24, 2002

(54) SYSTEM AND METHOD FOR IDENTIFYING FORM TYPE IN A HANDWRITING RECOGNITION BASED FORM COMPLETION SYSTEM

(75) Inventors: Paul Robert Carini, Sherman, CT (US); Yi-Min Chee, Sleepy Hollow, NY (US); Michael S. Karasick, Pound Ridge, NY (US); Danny Soroker, Larchmont, NY (US); Samuel Monk Weber, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/360,740

(22) Filed: Jul. 26, 1999

(51) Int. Cl.[7] ............................. G06K 9/00; G06K 9/22; G06K 11/06; H04N 1/024; G06F 15/00
(52) U.S. Cl. ....................... 382/187; 382/181; 382/186; 382/188; 382/202; 382/306; 382/313; 382/314; 178/18.01; 178/18.03; 358/473; 358/478; 707/500; 707/505; 707/506; 707/507; 707/541
(58) Field of Search ................................ 382/113, 120, 382/121, 122, 181, 185, 186, 187, 188, 190, 198, 202, 309, 312, 313, 314, 315, 306; 178/18.03, 19.04, 18.01; 358/473, 474, 478; 707/500, 505, 506, 507, 508, 517, 520, 541

(56) References Cited

U.S. PATENT DOCUMENTS

| | | | | |
|---|---|---|---|---|
| 5,038,392 A | * | 8/1991 | Morris et al. | 382/175 |
| 5,060,980 A | * | 10/1991 | Johnson et al. | 283/70 |
| 5,091,868 A | * | 2/1992 | Pickens et al. | 707/506 |
| 5,243,149 A | | 9/1993 | Comerford et al. | 178/18.03 |
| 5,276,794 A | * | 1/1994 | Lamb, Jr. | 707/507 |
| 5,459,796 A | * | 10/1995 | Boyer | 382/187 |
| 5,587,560 A | * | 12/1996 | Crooks et al. | 178/18.03 |
| 5,627,349 A | * | 5/1997 | Shetye et al. | 178/18.01 |
| 5,629,499 A | | 5/1997 | Flickinger et al. | 178/18.01 |
| 5,704,029 A | * | 12/1997 | Wright, Jr. | 707/505 |
| 5,850,214 A | * | 12/1998 | McNally et al. | 345/173 |
| 5,900,943 A | * | 5/1999 | Owen | 356/406 |
| 6,050,490 A | * | 4/2000 | Leichner et al. | 235/462.49 |
| 6,272,506 B1 | * | 8/2001 | Bell | 707/507 |

* cited by examiner

Primary Examiner—Leo Boudreau
Assistant Examiner—Daniel G. Mariam
(74) Attorney, Agent, or Firm—Paul J. Otterstedt (57) ABSTRACT

The system of the present invention includes a form design component, a form description repository, and a forms processing component Each form used with the system has a layout including a form identifier field with a common location space for each given form of the plurality of different types of forms. The forms processing component is coupled to the form description repository and receives data from an electronic clipboard, through an interface port, which permits recognition of a unique form identifier, communication with the form description repository, receipt of a form definition corresponding to the unique form identifier, and correct processing of the data on the given form (based on the identifier) The method includes generating a form identifier field having a common location space for each different type of form, prompting a user of the system to enter a unique form identifier into the field, via input of at least one handwritten stroke, recording electronic stroke data indicative of the at least one handwritten stroke, storing the stroke data together with electronic entry field data indicative of contents of other fields of the given form, and then invoking a handwriting recognition engine on the stroke data so as to obtain correct identity of each given form, thereby permitting proper processing of the electronic entry field data.

18 Claims, 6 Drawing Sheets

FIG-1

| NAME | TYPE | X | Y | W | H |
|---|---|---|---|---|---|
| FIRST NAME, | STRING, | 1.0, | 2.5, | 4.0, | 0.75 |
| LAST NAME, | STRING, | 1.0, | 3.5, | 4.0, | 0.75 |

SYSTEM AND METHOD FOR IDENTIFYING FORM TYPE IN A HANDWRITING RECOGNITION BASED FORM COMPLETION SYSTEM

BACKGROUND OF THE INVENTION

1. Field of the Invention

The present invention relates to handwriting recognition, and more particularly relates to a system and method for identifying the type of form which is being used in a handwriting recognition based form completion system.

2. Brief Description of the Prior Art

Techniques exist for storing handwritten information generated on a clipboard style device and for transferring such information. Paper can be placed on the device, and a user can then write on the paper with a pen. The devices record the handwritten information as the user writes. One natural application for this technology is the processing of forms. Advantages of using this type of device for form processing include the fact that a written copy of the information can be retained, and that the handwritten information can be processed automatically by employing a handwriting recognition engine to interpret symbols on the filled-out form. One problem associated with the use of prior art clipboard style devices for form processing is the need to associate hadwritten data with a particular form when many different forms are being filled out using the same device. Prior art designs have included various strategies for identifying the type of form which is being filled out.

In U.S. Pat. No. 5,243,149 to Comerford et al., the entire form is scanned as part of the process of mounting the form on the clipboard. The disclosure of the aforesaid U.S. Pat. No. 5,243,149 to Comerford et al. is expressly incorporated herein by reference. In the device disclosed in the Comerford et al. patent, the necessity of scanning each page may prove to be inconvenient when many pages are involved. Further, added expense may be required due to the cost of components necessary for the scanning process. Finally, generation of redundant information may occur (i.e., the scanned image of the form, which is presumably not required, as the originator of the form already knows the form layout).

In another prior art design, exemplified by U.S. Pat. No. 5,629,499 to Flickinger et al., the clipboard device includes a menu system and a small display. Prior to filling out the form, the user of the system invokes the menu to select the form which is to be filled out, and the display then shows the identity of the form. Alternatively, the user can mark a check box in a certain location on the form, which then causes the identity of the form to be displayed and stored with the handwritten data. Although this design requires no additional components, it nevertheless requires the user to perform an action which is separate from the actual filling-out of the form. Furthermore, the device must store the identity of all known forms, since they have to be displayed on the menu. This means that when new forms are introduced, devices in the field must be updated in order to support the new form identifiers.

Both the Comerford et al. and Flickinger et al. devices afford the option for scanning a bar code located on a portion of the form, which contains a coded representation of the form's identity. The cost of the bar code scanning feature may be prohibitive, or at least undesirable; further, the user may be required to switch his or her focus from handwriting entry of data on the form to an alternative activity. This may be perceived as a nuisance by the user, or even more undesirably, the user may forget to scan the bar code of the form.

There is, therefore, a need in the prior art for a system and method for identifying form type in a handwriting recognition based form completion system which does not result in additional component cost, which makes the identification step a natural part of the form-filling process, and which allows new types of forms to be introduced without the need to update clipboard-style devices deployed in the field.

SUMMARY OF THE INVENTION

The present invention, which addresses the needs of the prior art provides a system and method for identifying the type of form being used in a handwriting recognition based form completion system. The method is intended for use with such a form completion system wherein a plurality of different types of forms are employed. The method includes the steps of (a) generating a form identifier field; (b) prompting a user of the system to enter a unique form identifier in the form identifier field; (c) recording electronic stroke data; (d) storing the electronic stroke data; and (e) invoking a handwriting recognition engine on the stroke data.

In step (a), the form identifier field has a common location space for each of the different types of forms. In step (b), the user is prompted to enter the unique form identifier in the form identifier field for a given one of the different types of forms, via input of the at least one handwritten stroke. The electronic stroke data which is recorded in step (c) is indicative of this at least one handwritten stroke. In step (d), the electronic entry field data which is stored together with the electronic stroke data is indicative of contents of other fields of the given form. In step (e), when the handwriting recognition engine is invoked, it is invoked on the stroke data to obtain the correct identity of the given form, such that the electronic entry field data can be properly processed.

The handwriting recognition based form completion system of the present invention is intended for use with a plurality of different types of forms. The system includes (a) a form design component; (b) a form description repository; and (c) a forms processing component. The form design component is configured to specify a layout for each given form of the plurality of different types of forms. Each of the layouts includes a form identifier field having a common location space for each given form of the plurality of different types of forms.

The form description repository is coupled to the form design component and electromagnetically stores data corresponding to each of the layouts. The forms processing component is coupled to the form description repository and is provided with an electronic clipboard interface port which is configured to receive electronic stroke data and electronic entry field data from a suitable electronic clipboard device. The electronic stroke data corresponds to a unique form identifier which in turn corresponds to a given one of the plurality of different types of form. The forms processing component is configured to receive the electronic stroke data, recognize the unique form identifier, and communicate the unique form identifier to the form description repository. The forms processing component is further configured to receive a form definition, corresponding to the unique form identifier, from the form description repository, and to correctly process the electronic entry field data based thereon.

Method steps of the present invention can be appropriately and advantageously implemented using appropriate software running on a general purpose computer. Accordingly, the present invention also includes a program storage device readable by machine, tangibly embodying a program of instructions executable by the machine to perform method steps for identifying form type in a handwriting recognition based form completion system which is intended for use with a plurality of different types of forms. Method steps which can be performed in this manner include: (a) generating a form identifier field; (b) generating a plurality of different types of forms; (c) receiving electronic stroke data indicative of at least one handwriting stroke; and (d) invoking a handwriting recognition engine on the stroke data. As previously described, the form identifier field can have a common location space for each of the different types of forms. Each of the forms can include a prompt to prompt a user of the system to enter a unique form identifier in the form identifier field, for each one of the given forms, via input of at least one handwritten stroke. Such input is advantageously carried out when the given form is collocated with a suitable electronic clipboard device. The electronic stroke data which is indicative of the at least one handwriting stroke can be received together with electronic entry field data which is indicative of contents of other fields of the given form. The handwriting recognition engine can be invoked on the stroke data to obtain the correct identity of the given form, such that the electronic entry field data can be properly processed.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE INVENTION

Figure 1:
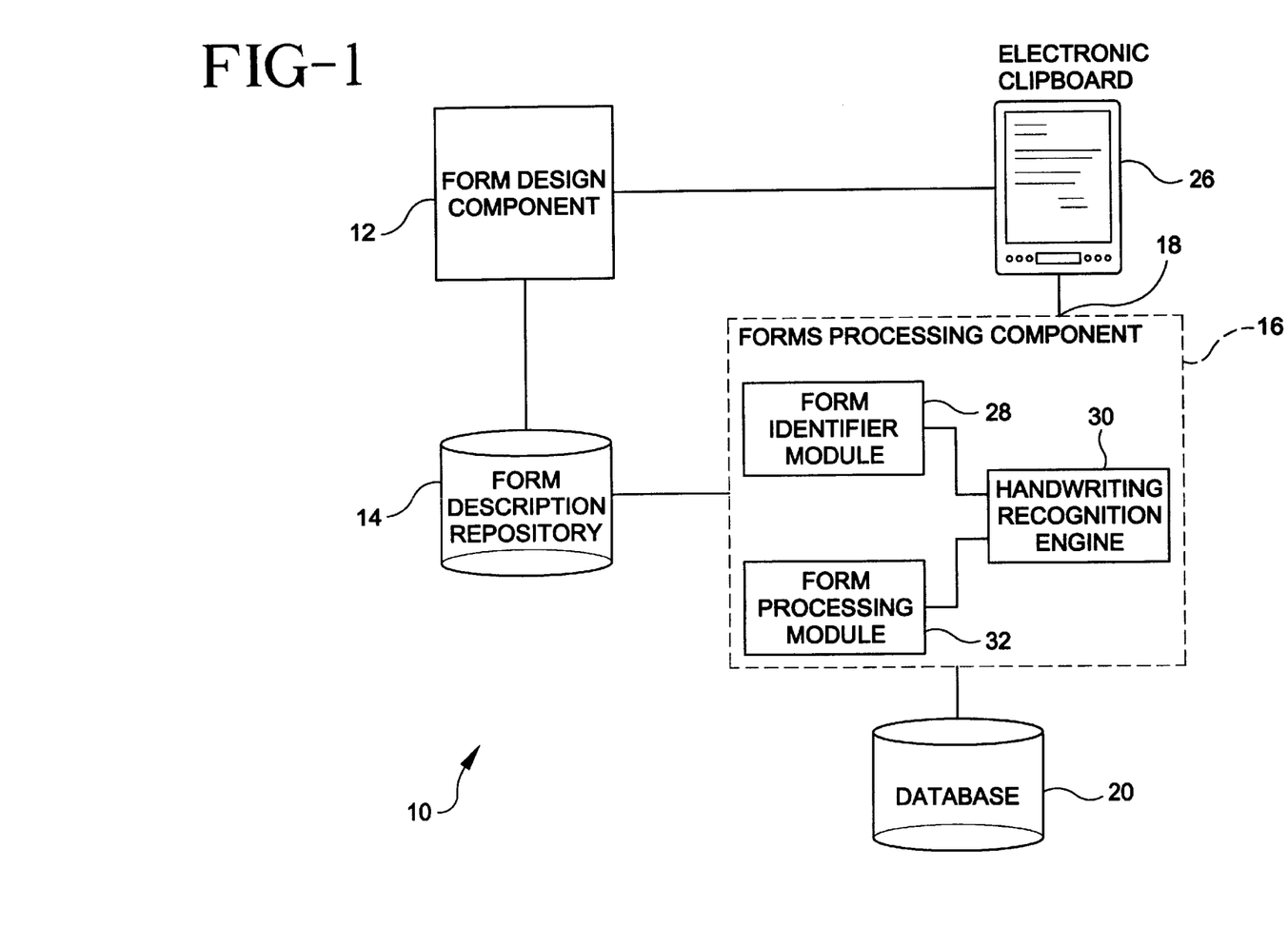
FIG. 1 is a block diagram of a form completion system of the present invention.

Reference should now be had to FIG. 1 which shows a handwriting recognition based form completion system, of the present invention, which is intended for use with a plurality of different types of forms. The system is designated generally as 10. The system includes a form design component 12 which is configured to specify a layout for each given form of the plurality of different types of forms. Each of the layouts includes a form identifier field which has a common location space for each given form of the plurality of different types of forms. Further discussion regarding the forms and the form identifier field will be provided below. It will be appreciated that each given form of the plurality of different types of forms will have a unique identifier associated with it, e.g. "FORM TYPE 1," "FORM TYPE 2" and the like.

System 10 further includes a form description repository 14 which is coupled to the form design component 12 and which electromagnetically stores data corresponding to each of the layouts. As used herein, "electromagnetically" should be broadly understood to include semiconductor memory, optical storage techniques, and magnetic storage methods such as hard or floppy disk drives, tape, and the like.

System 10 further includes a forms processing component 16 which is coupled to the form description repository 14. The forms processing component 16 is provided with an electronic clipboard interface port 18 which is configured to receive electronic stroke data and electronic entry field data. The electronic stroke data corresponds to a unique form identifier, which in turn corresponds to a given one of the plurality of different types of forms. The forms processing component 16 is configured to receive the electronic stroke data, recognize the unique form identifier, and communicate the unique form identifier to the form description repository 14. The forms processing component 16 is further configured to receive a form definition, corresponding to the unique form identifier, from the form description repository 14 and to then correctly process the electronic entry field data based thereon.

The electronic stroke data is used to refer to electromagnetically-stored data corresponding to one or more handwriting-type strokes which are entered in the form identifier field and are used to identify the type of form. The electronic entry field data is used to refer to other electromagnetically-stored data which is indicative of other (typically handwritten) data entered on the form. Those of skill in the handwriting recognition art are familiar with appropriate ways to electromagnetically store handwriting-type data.

The system 10 can optionally further include a data base module 20 which is coupled to the forms processing component 18 and which receives and stores processed electronic stroke data therefrom.

Figure 2:
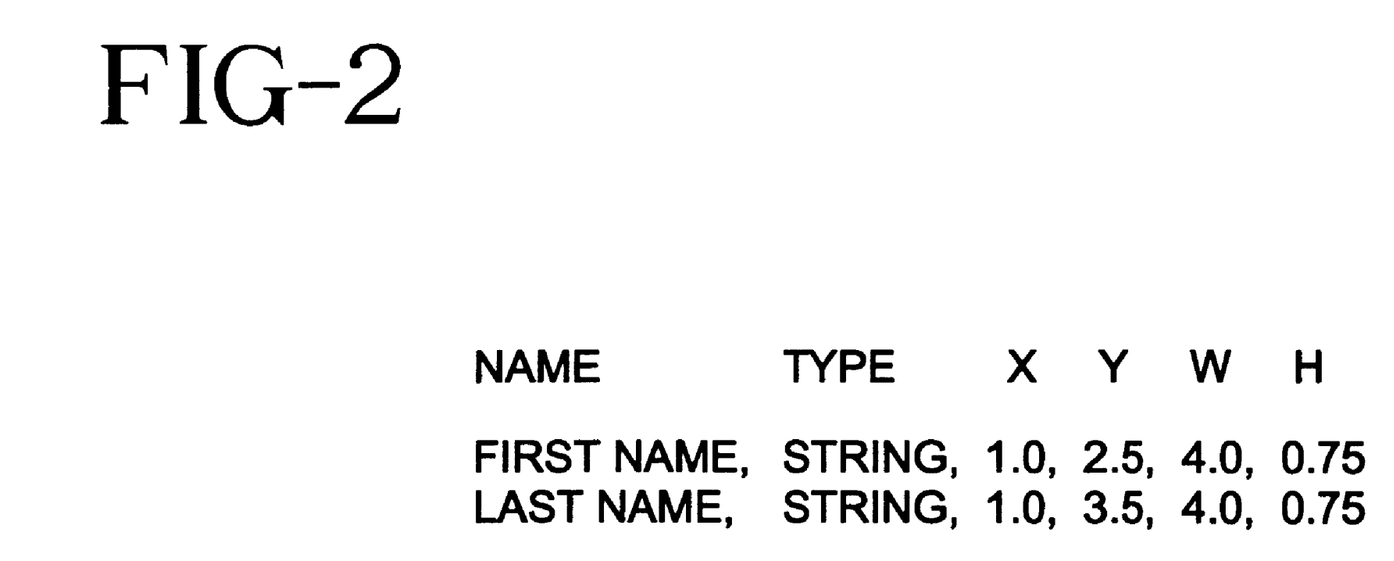
FIG. 2 shows example form data for a simple form used with the present invention.

The form design component 12 can be implemented in a number of different ways. In a relatively simple implementation, it can be an input device for a general purpose computer, for example, a keyboard, which receives coordinate data corresponding to fields on a human-generated one of the given forms. Reference should now be had to FIG. 2 which shows exemplary coordinate data which could be easily generated by a human operator. For every field, the name of the field, type of variable associated with the field, x and y coordinates, as well as width and height of the field are specified. The x and y components can refer to any convenient portion of the field, for example, any of the corners of the field, the center of the field, or any other convenient location, so long as a consistent definition is picked. Coordinates other than Cartesian coordinates could be employed. It will be appreciated that simple forms can easily be designed by hand by a human operator with locations of fields specified as shown in FIG. 2.

If desired, the form design component could instead include a general purpose computer equipped with computer aided form design (CAFD) software which would automatically generate coordinate data corresponding to fields on a given one of the forms which was generated with the CAFD software. Such types of programs are known, for example, such programs are available from Cardiff and IMSI. Further, it is a straightforward programming operation, well within the ability of those of skill in the art, to prepare a suitable CAFD program which will prompt a user, whether with a conventional or graphical interface, to specify form data fields and locations, producing a suitable output file of the type shown in FIG. 2. Note that the exemplary data shown in FIG. 2 is shown in ASCII form. However, particularly when a CAFD tool is used, it might be possible, or desirable, to specify the data in binary or other compressed form.

Figure 3A:
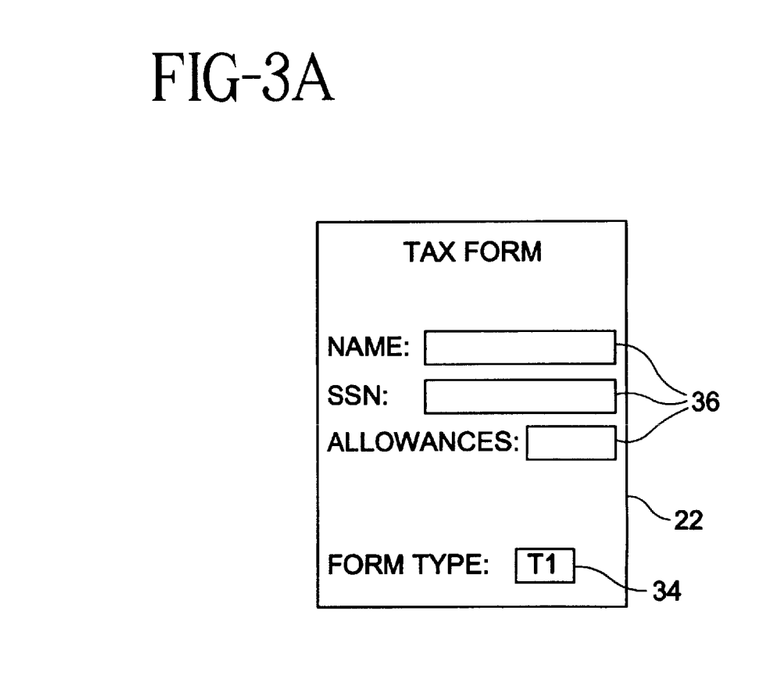
FIG. 3A depicts a sample tax form used with the present invention.
Figure 3B:
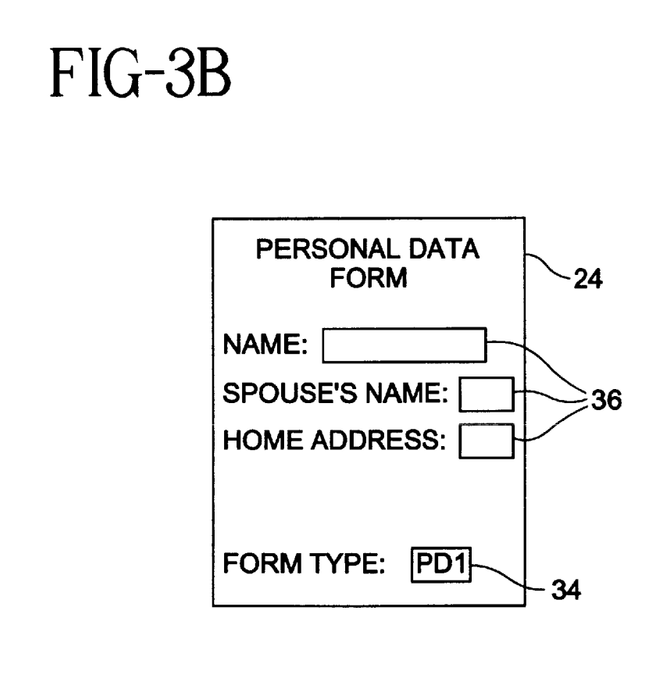
FIG. 3B depicts a sample personal data form used with the present invention.

Reference should now again be given to FIG. 1, together with FIGS. 3A and 3B. System 10 can further include at least two paper forms 22, 24 as depicted in FIGS. 3A and 3B respectively. The at least two paper forms 22, 24 can be designed by the form design component 12. The exemplary forms are shown as a tax form and a personal data form. It is to be understood that these are purely by way of example, and the at least two paper forms can be any suitable type of form which it is desired to use with the system 10.

Referring back to FIG. 1, system 10 can further include an electronic clipboard 26 which is coupled to the electronic clipboard interface port 18 of the forms processing component 16 and which is configured to gather the aforementioned electronic stroke data and electronic entry field data. As noted, the electronic stroke data can correspond to the unique form identification which is obtained from the common location space of the form identifier field. Further, the electronic entry field data, as noted, is associated with the other fields on each of the at least two forms 22, 24.

Still referring to FIG. 1, the forms processing component 16 can in turn include a form identifier module 28, a handwriting recognition engine 30, and a form processing module 32. The form identifier module 28 can be coupled to the form description repository 14 and to the electronic clipboard interface port 18, and can be configured to receive, from the form description repository 14, data indicating the common location space of the form identifier field. The form identifier module 28 can be further configured to receive the electronic stroke data from the electronic clipboard interface port 18, and to communicate the unique form identifier to the form description repository 14. The form identifier module 28 can be further configured to receive the form definition. Further description of the interconnections and data flow among the various components now being described will be set forth below.

Handwriting recognition engine 30 can be coupled to the form identifier module 28 and can be configured to receive the electronic stroke data from the form identifier module 28 and to recognize the unique form identifier. Form processing module 32 can be coupled to the form identifier module, either directly, or as shown, through the handwriting recognition engine, and can be configured to receive the form definition from the form identifier module 28 and the electronic entry field data from the electronic clipboard interface port 18. The form processing module can be further configured to correctly process the electronic entry field data based on the form definition.

Reference should again be had to FIGS. 3A and 3B. Note the form identifier field 34 which is located in the same place on both forms. It is strongly preferred that the form identifier field be located in the same place on all forms for use with a given system. If desired for some reason, several locations could be identified as allowable locations for the form identifier field, so long as the system would "know" where to look. However, to avoid ambiguity, and for simplicity, it is believed strongly preferable that all forms have the location in the same place. As used in the specification and claims, "common location space" should be construed to include an identical location or one of a small plurality of standard locations in which it is known for the system to scan and look for the form identifier. In the case of FIG. 3A, the form identifier is "T1." In the case of FIG. 3B, the form identifier is "PD1." Other fields of form 3A could include name, social security number, and number of withholding allowances. Other fields in form 3B could include name, spouse's name, and home address. These other fields are all designated generally as 36. As noted, the data entered in the other fields is noted as electronic entry field data, and is indicative of the contents of the other fields. With the present invention, there is no need to reprogram or update electronic clipboard devices, since form identification takes place in module 28.

Figure 4:
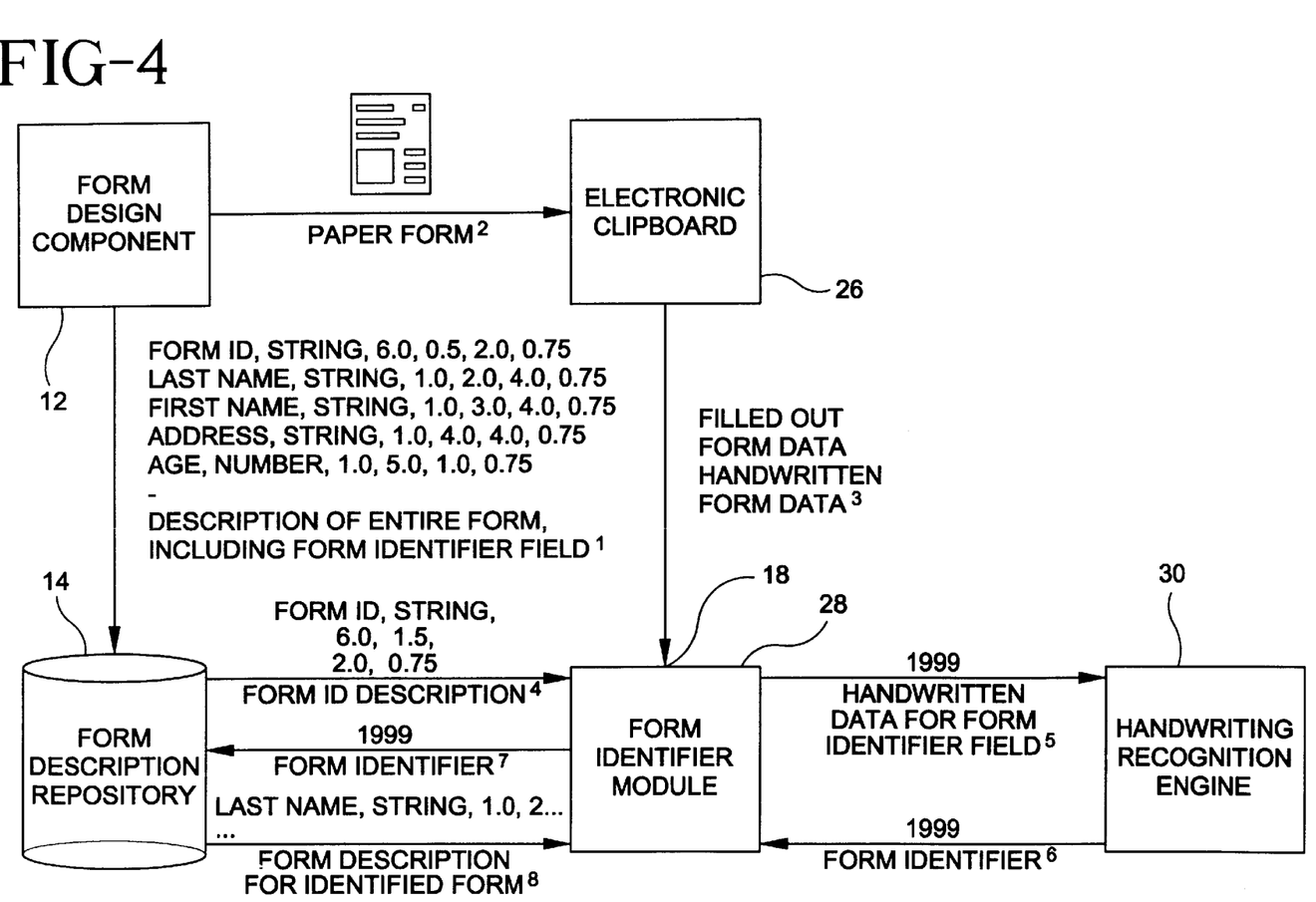
FIG. 4 is a block diagram of the system of FIG. 1, with certain components omitted for clarity, depicting flow of data through the system.

Reference should now be had to FIG. 4, which shows certain components of the system 10 previously described with respect to FIG. 1, as well as the flow of data therethrough, and the interconnections therebetween. During processing of a completed form, form identity can be determined by having the form identifier module 28 read the location of the form identifier field from the output generated by the form design component 12, which is stored in the form description repository 14. Form identifier module 28 can accumulate the at least one stroke, which can include, for example, handwritten characters and symbols, which are contained within the form identifier field. Note that the form identifier field can, as shown in FIGS. 3A and 3B, include a bounding box. The handwritten data contained within the field can then be passed to the handwriting recognition engine 30, which interprets the data and returns the resulting form identifier to the form identifier module 28.

In the exemplary case shown in FIG. 4, the form design component 12 supplies to the form description repository 14 a description of the entire form, including the location of the form identifier field. In this case, the form identifier is given the variable name "Form ID" and is designated as a string variable. The x and y coordinates are respectively 6.0 and 0.5, with a width of 2.0 and a height of 0.75. This information is then passed from the form description repository 14 to the form identifier module 28 as the form ID description. Handwritten data is received through the electronic clipboard interface 18 by the form identifier module 28 and the exemplary handwritten strokes, in this case, the handwritten strokes "1999" are passed to the handwriting recognition engine 30 which returns the form identifier, in this case, the recognized characters "1999." The form identifier module 28 then uses the returned form identifier to retrieve the appropriate form definition for the page, and passes the definition and the handwritten data to the forms processing module 32 (omitted for clarity in FIG. 4) to complete the processing of the form. Thus, in the example shown, the form identifier 1999 is passed from the form identifier module 28 to the form description repository 14, and the form description for the identified form is then returned from the repository 14 to the identifier module 28, for use in processing the rest of the handwritten data from the form.

Figure 5:
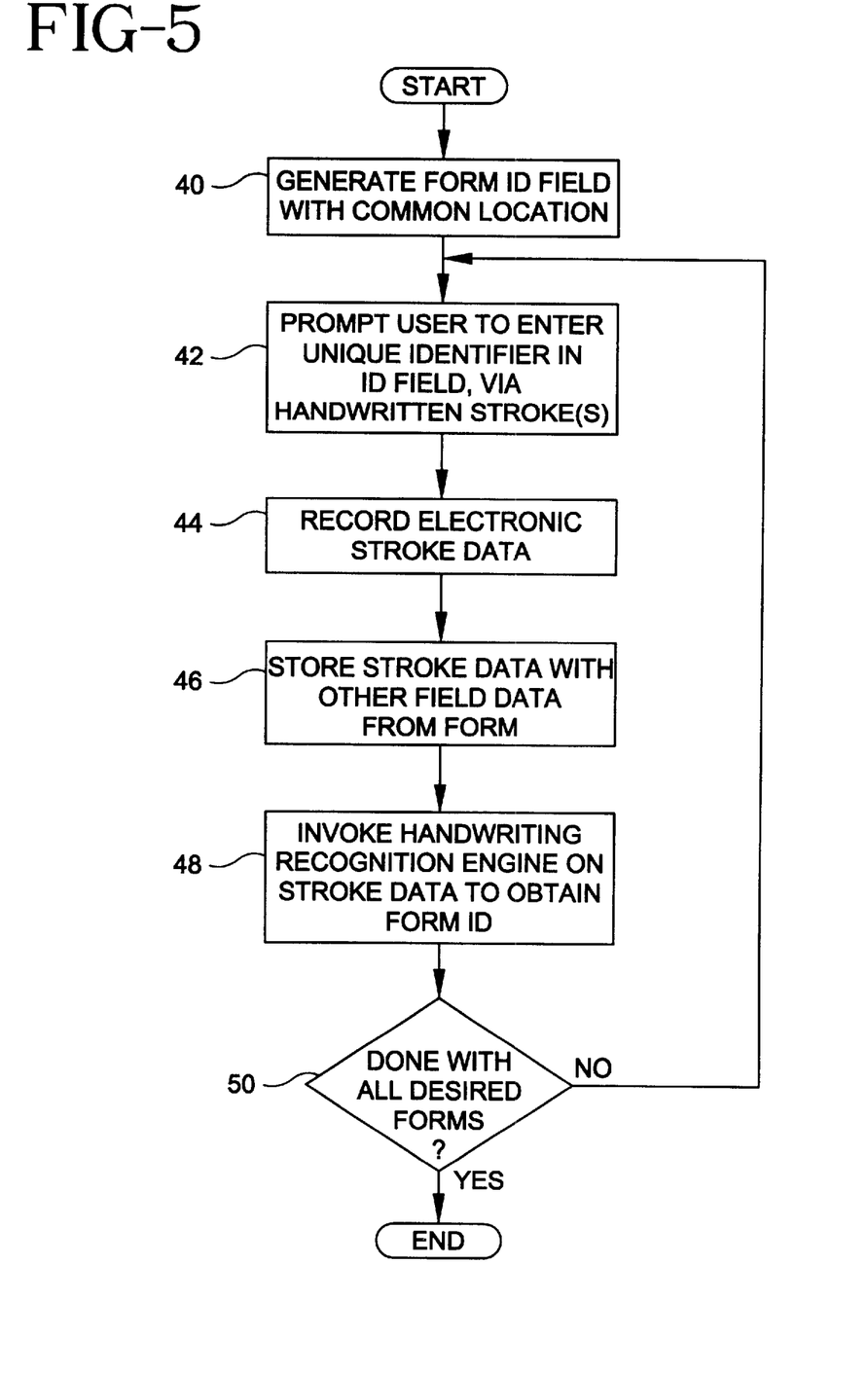
FIG. 5 is a flow chart depicting a method according to the present invention for identifying form type.

Reference should now been given to FIG. 5, which presents a flow chart useful in illustrating steps in a method, according to the present invention, for identifying the form type in a handwriting recognition based form completion system, which is intended for use with a plurality of different types of forms. A first method step includes (a) generating a form identifier field which has a common location space for each of the different types of forms, per block 40. As noted, "common location space" most preferably includes an identical location for each form, but could include one of a few selected predefined locations, so long as the system "knows" where to look on each form for the identifier. The method further includes the step of (b) prompting a user of the system to enter a unique form identifier in the form identifier field (each given form of the plurality of different types of forms has a unique identifier associated with it, e.g., "FORM TYPE 1," "FORM TYPE 2" and the like), for a given one of the different types of forms, via input of at least one handwritten stroke, per block 42. Yet further, the method includes the step of (c) recording electronic stroke data which is indicative of the at least one handwritten stroke, per block 44.

A further method step includes (d) storing the electronic stroke data together with electronic entry field data which is indicative of contents of other fields of the given form, per block 46. Finally, the method includes the step of (e) invoking a handwriting recognition engine 30 on the stroke data to obtain correct identity of the given form, such that the electronic entry field data can be properly processed, per block 48.

Referring to block 50, if all desired forms have been processed, the process can end. However, if additional forms must be processed, steps (b)–(e) can be repeated for at least another given one of the different types of forms.

Figure 6A:
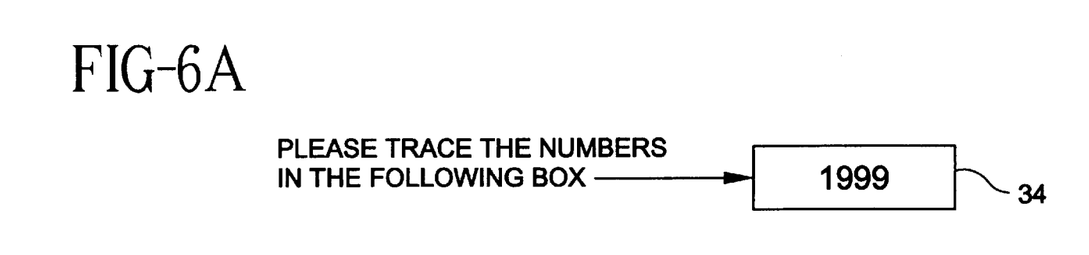
FIGS. 6A–6C show user prompts which prompt a user to enter a unique form identifier, in accordance with the present invention.
Figure 6B:
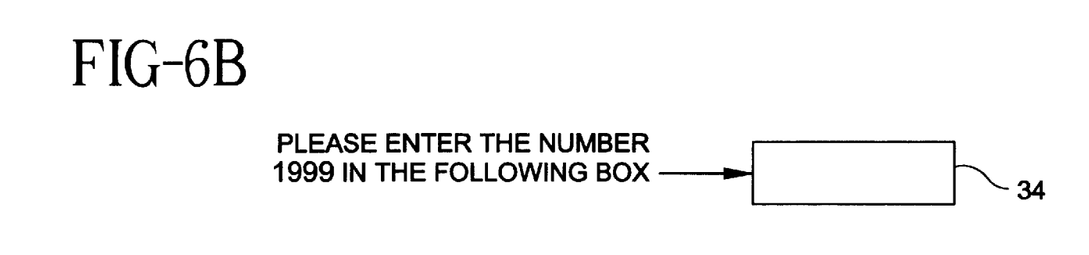
Figure 6C:
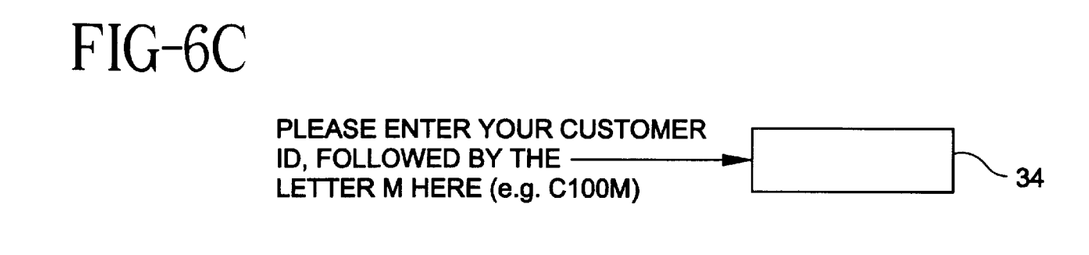

Reference should now be had to FIGS. 6A–6C, which show a number of ways in which the prompting step (b) can be performed. With reference first to FIG. 6A, step (b) can comprise prompting the user to trace over a printed representation of the unique form identifier which is present within the form identifier field 34 on the given form. In this case, the user is prompted to trace over the form identifier "1999." It is believed that the preferred method of prompting the user is simply to print an appropriate prompt on the paper forms which are used with the electronic clipboard device 26. With reference now to FIG. 6B, an alternative way of accomplishing the prompting step (b) is to prompt the user to enter, via handwriting, the unique form identifier into the form identification field 34 on the given form, with the form identification field 34 being blank prior to the entry. Thus, here the user is prompted to enter "1999" into the box, which is blank prior to the entry.

In another alternative, as shown in FIG. 6C, the prompting step (b) can comprise prompting the user to enter, via handwriting, the unique form identifier into the form identification field 34 on the given form, with the unique form identifier comprising a combination of a form type field and a user-associated field. For example, the form type field could be "M" referring to musical preferences of a user, and the user-associated field could be a customer ID, for example, in this case, "C100." The unique form identifier could then comprise the combination of the form type field and user-associated field; in this case, the concatenation thereof ("C100M"). Accordingly, when using the type of prompting just described, wherein the form identifier comprises a form type field and a user-associated field, step (e) can further comprise determining form type and user identity. For example, the form type could be "M" for music, listing musical preferences of a given user, and the user identity could be user "C100". User identity should be understood broadly to include identification of an individual, or a group of individuals or an organization, for example an employer of one or more individuals.

It will be appreciated that step (b) requires the user to input at least one handwritten stroke. It is believed that, more typically, this step will involve prompting the user to enter a plurality of handwritten strokes. For example, a plurality of strokes would be required to trace the number "1999" as discussed with respect to FIGS. 6A–6C. The prompting step, that is, step (b), can include prompting the user to enter at least one numeral, or at least one alphabetical character, or at least one alphanumeric character. Furthermore, the prompting need not be limited to numerics, alphabetical symbols, or alphanumerics. In fact, any type of symbol or stroke which can be reliably understood by the handwriting recognition engine can be employed. For example, new symbols not on a standard typewriter keyboard could be defined by users or administrators of the form completion system 10.

Referring back to FIG. 2 and the discussion above, it will be appreciated that method step (a) can include specifying at least two spatial coordinates, a width and a height for the form identifier field 34.

The system 10 of the present invention can be implemented in a number of ways. One preferred implementation would be the use of a general purpose computer such as a PC, with appropriate software and a suitable docking station for the electronic clipboard 26. The electronic clipboard 26 can preferably be a so-called "CrossPad" as available from the AT Cross Company of Lincoln, R.I. Most preferably, two personal computers could be employed. For example, the form design component 12 could be implemented on a first personal computer, possibly under the control of a central forms authority. If a CAFD tool were employed, it could reside on this personal computer. A second personal computer could then be used to implement the forms processing component 16, the form description repository 14, and the database 20. More preferably, the second PC (and indeed, as many as were desired throughout an organization) could each be used to implement the forms processing component 16 and electronic clipboard interface port 18, with the database 20 and the form description repository 14 being shared network resources. As another alternative, local PCs could simply be used to interface with electronic clipboard 26 through interface port 18, and data could be sent to a server which would run the form processing component 16.

As noted, suitable computer-aided form design programs are available commercially from Cardiff and IMSI, and can also easily be programmed by one of skill in the art. IBM "KitchenInk" from IBM Corporation can also be employed. If it was desired to program the CAFD tool from scratch, it would be configured to permit specification of the field name, data type and location, and optionally the type of alphabet which would be permitted for a given field (numbers, letters, combination thereof, or other symbols). An allowed word list could also be programmed in, for example, a list of two character state abbreviations. Preferably, the output of the form design tool is an ordinary ASCII text file as illustrated in FIG. 2, but again, it should be noted that compressed or binary data can be employed. When forms are manually generated, it is believed that having a user manually type in an ASCII text file is preferred.

The form description repository 14 could be in the form of a file or database, for example. The handwritten data received by the forms processing component 16 through the electronic clipboard interface port 18 could contain many pages of form data corresponding to multiple filled-out forms. The form identifier module 28 could ascertain the identity of the form to which each page of handwritten data belongs, and could then feed each page to the forms processing module 32 along with its form identifier. Note that the forms processing module can be implemented as known in prior art devices, such as in the Flickinger et al. and Comerford et al. patents discussed above. Accordingly, the form processing module 32 has not been shown in FIG. 4, since once the type of form is identified by the present invention, forms processing can then be carried out in a conventional fashion.

Any suitable handwriting recognition engine as known in the art can be used for handwriting recognition engine 30. One preferred type of engine is the IBM Handwriting Recognition Engine from IBM Corporation.

As noted, the output of the form processing module 32 can be fed directly into a database 20 for storage of the collected data. Processing of a completed form with the present invention can be entirely automated, requiring human intervention only when exceptional conditions occur, such as failure to recognize a given set of handwritten data.

Referring back to the description of the ID field 34, and with reference to the other fields 36, it is preferred that each field be enclosed in a bounding box described by the coordinates of the upper left hand corner of the field, followed by the width and height of the field. However, as noted, other alternative representations could be used. Again, it should be emphasized that it is strongly preferred that the identical location be used for the identification field 34 on each form of the set of forms to be used with the system 10. However, if it were desired for some reason, several locations could be used, so long as they were dedicated locations and the system would "know" to scan each designated location sequentially until the identifier were found. If it were desirable to use this method for some reason, all the designated locations in which the form identifier was not present could be kept blank, or form identification could be carried out by scanning stroke data in some or all (rather than just one) of the dedicated locations. For example, form type "M" could be entered in one dedicated location (top left corner, e.g.,) and user identity "C 100" could be entered in another dedicated location (bottom right corner, e.g.,) together comprising the unique form identifier.

As noted, the form identifier can be any type of alphanumeric data, but can consist of any characters or symbols which the handwriting recognition engine 30 is able to interpret. The descriptions generated by the form design component 12 are stored in a manner which permits the form identifier to be used to retrieve the corresponding description for a given form.

Using the described method and system of the present invention, new forms can be introduced into use very rapidly. The form designer simply assigns a unique identifier for the new form, and printed copies of the new form can be used with any device already employed in the field. Since the device is not aware of the forms, it does not need to be updated with the information for the new form. The ability to use arbitrary characters for the form identifier also permits customization of forms. A form generator can produce forms which are customized for a particular individual, such as a customer. The generator can assign a form identifier for the customized form which contains an individual's identification number, such as a customer number, as part of the form identifier, as described above with respect to FIG. 6C. Again, it should be emphasized that electronic clipboard devices 26 already in the field need not be updated with the new form information; implementation of new forms is completely transparent to these devices and only the form description repository 14 needs to be updated.

As noted, method steps of the present invention can appropriately and advantageously be carried out using a suitably programmed general purpose computer. Accordingly, the present invention includes a program storage device readable by machine, tangibly embodying a program of instructions executable by the machine to perform any of the method steps herein described for identifying form type in a handwriting recognition based form completion system which is intended for use with a plurality of different types of forms. Such method steps could include, for example, (a) generating a form identifier field; (b) generating the plurality of different types of forms; (c) receiving electronic stroke data; and (d) invoking a handwriting recognition engine. In step (a), as discussed above, the form identifier field has a common location space for each of the different types of forms. In step (b), each of the forms includes a prompt to prompt a user of the system to enter a unique form identifier in the form identifier field, for each given one of the different types of forms, via input of at least one handwritten stroke. Such entry occurs when the given form is collocated with a suitable electronic clipboard device 26. Each given form has a unique identifier, as discussed above.

A further method step (c) includes receiving electronic stroke data indicative of the at least one handwriting stroke, together with electronic entry field data indicative of contents of the other fields 36 of the given form. Finally, step (d) includes invoking the handwriting recognition engine 30 on the stroke data to obtain correct identity of the given form such that the electronic entry field data can be properly processed.

Again, it is to be emphasized that any of the method steps, in any combination, can be encoded and be tangibly embodied on a program storage device according to the present invention.

While there have been described what are presently believed to be the preferred embodiments of the invention, those skilled in the art will realize that various changes and modifications may be made to the invention without departing from the spirit of the invention, and it is intended to claim all such changes and modifications as fall within the scope of the invention.

What is claimed is:

1. A method for identifying form type in a handwriting recognition based form completion system intended for use with a plurality of different types of forms, said method comprising the steps of:

(a) generating a form identifier field having a common location space for each of the different types of forms;

(b) prompting a user of the system to enter a unique form identifier in said form identifier field, for a given one of the different types of forms, via input of at least one handwritten stroke;

(c) recording electronic stroke data indicative of said at least one handwritten stroke;

(d) storing said electronic stroke data together with electronic entry field data indicative of contents of other fields of said given form; and (e) invoking a handwriting recognition engine on said stroke data to obtain correct identity of said given form such that said electronic entry field data can be properly processed.

2. The method of claim 1, wherein step (b) comprises prompting the user to trace over a printed representation of said unique form identifier which is present within said form identifier field on said given form.

3. The method of claim 1, wherein step (b) comprises prompting the user to enter, via handwriting, said unique form identifier into said form identification field on said given form, said form identification field being blank prior to said entry.

4. The method of claim 1, wherein step (b) comprises prompting the user to enter, via handwriting, said unique form identifier into said form identification field on said given form, said unique form identifier comprising a combination of a form type field and a user-associated field.

5. The method of claim 4, wherein step (e) further comprises determining form type and user identity.

6. The method of claim 1, wherein step (b) includes prompting the user to enter a plurality of handwritten strokes.

7. The method of claim 1, wherein step (b) includes prompting the user to enter at least one numeral.

8. The method of claim 1, wherein step (b) includes prompting the user to enter at least one alphabetical character.

9. The method of claim 1, wherein step (b) comprises prompting the user to enter at least one alphanumeric character.

10. The method of claim 1, further comprising the additional step of.

(f) repeating steps (b)–(e) for at least another given one of the different types of forms.

11. The method of claim 1, wherein step (a) comprises specifying at least two spatial coordinates, a width, and a height for said form identifier field.

12. A handwriting recognition based form completion system for use with a plurality of different types of forms, said system comprising:

(a) a form design component which is configured to specify a layout for each given form of the plurality of different types of forms, each of said layouts including a form identifier field having a common location space for each given form of the plurality of different types of forms;

(b) a form description repository which is coupled to said form design component and which electromagnetically stores data corresponding to each of said layouts; and (c) a forms processing component which is coupled to said form description repository, said forms processing component having an electronic clipboard interface port which is configured to receive electronic stroke data and electronic entry field data, said electronic stroke data corresponding to a unique form identifier which in turn corresponds to a given one of the plurality of different types of form, said forms processing component being configured to receive said electronic stroke data, recognize said unique form identifier, and communicate said unique form identifier to said form description repository, said forms processing component being further configured to receive a form definition, corresponding to said unique form identifier, from said form description repository and to correctly process said electronic entry field data based thereon.

13. The system of claim 12, further comprising a database module which is coupled to said forms processing component and which receives and stores processed electronic stroke data therefrom.

14. The system of claim 12, wherein said form design component comprises a computer input device which receives coordinate data corresponding to fields on a human generated one of said given forms.

15. The system of claim 12, wherein said form design component comprises a general purpose computer equipped with computer aided form design (CAFD) software which automatically generates coordinate data corresponding to fields on a CAFD-generated one of said given forms.

16. The system of claim 12, further comprising:

at least two paper forms, corresponding to at least two of said plurality of different types of forms, said at least two paper forms being designed by said form design component; and an electronic clipboard which is coupled to said electronic clipboard interface port of said forms processing component and which is configured to gather:

said electronic stroke data, corresponding to said unique form identification, from said common location space of said form identifier field; and said electronic entry field data from other fields on each of said at least two forms.

17. The system of claim 12, wherein said forms processing component further comprises:

a form identifier module which is coupled to said form description repository and said electronic clipboard interface port, and which is configured to receive, from said form description repository, data indicating said common location space of said form identifier field, said form identifier module being further configured to receive said electronic stroke data from said electronic clipboard interface port, and to communicate said unique form identifier to said form description repository, said form identifier module being further configured to receive said form definition;

a handwriting recognition engine which is coupled to said form identifier module and which is configured to receive said electronic stroke data from said form identifier module and to recognize said unique form identifier; and a form processing module which is coupled to said form identifier module and said handwriting recognition engine, said form processing module being configured to receive said form definition from said form identifier module and said electronic entry field data from said electronic clipboard interface port, said form processing module being further configured to correctly process said electronic entry field data based on said form definition.

18. A program storage device readable by machine, tangibly embodying a program of instructions executable by the machine to perform method steps for identifying form type in a handwriting recognition based form completion system intended for use with a plurality of different types of forms, said method steps comprising:

(a) generating a form identifier field having a common location space for each of the different types of forms;

(b) generating the plurality of different types of forms, each of said forms including a prompt to prompt a user of the system to enter a unique form identifier in said form identifier field, for each given one of the different types of forms, via input of at least one handwritten stroke, when the given form is collocated with an electronic clipboard device;

(c) receiving electronic stroke data indicative of said at least one handwriting stroke, together with electronic entry field data indicative of contents of other fields of said given form; and (d) invoking a handwriting recognition engine on said stroke data to obtain correct identity of said given form such that said electronic entry field data can be properly processed.

* * * * *